United States Patent Office.

DAVID R. P. HILL, OF FREDERICKTOWN, PENNSYLVANIA, ASSIGNOR TO HIMSELF, E F. WEAVER, AND H. H. WEAVER, OF SAME PLACE.

Letters Patent No. 110,361, dated December 20, 1870.

IMPROVEMENT IN LUBRICATING-OILS.

The Schedule referred to in these Letters Patent and making part of the same.

*To all whom it may concern:*

Be it known that I, DAVID R. P. HILL, of Fredericktown, in the county of Washington and in the State of Pennsylvania, have invented certain new and useful Improvements in Lubricating-Oil, and do hereby declare that the following is a full, clear, and exact description thereof.

The nature of my invention consists in a new and improved "lubricating-oil," which is composed of the following ingredients and in about the following proportions:

Ten gallons crude petroleum-oil, one pound sal-soda, one pound lime, ten pounds tallow, five pounds lard, three pounds salt, one quart pine-tar, one quart spirits turpentine, two ounces gum camphor, and one pint alcohol.

These ingredients are mixed in the following manner:

I first take the crude petroleum-oil, put in a kettle and add to it the sal-soda and lime. This I let boil for about thirty minutes, and let it settle.

I then rock it off and add the tallow, lard, salt, and pine-tar, when the mixture is boiled for about one hour, after which the turpentine is added.

I then dissolve the camphor in the alcohol and add this to the oil after it is partly cooled, and the oil is complete The soda and lime are used for clarifying the oil, and the lard and tallow for giving it body. The camphor, salt, and tar combined are for cooling purposes, and the alcohol and turpentine to keep the oil from chilling, thus forming a new and complete lubricator.

I do not confine myself to the exact proportions of the ingredients herein mentioned, as they may be varied to suit the purposes for which the oil is desired.

Having thus fully described my invention,

What I claim as new, and desire to secure by Letters Patent, is—

The lubricating-oil herein described, composed of the ingredients substantially as set forth.

In testimony that I claim the foregoing I have hereunto set my hand this 9th day of November, 1870.

DAVID R. P. HILL.

Witnesses:
WM. W. HAWTHORN,
ALEXANDER DALBEY.